Figure 1:
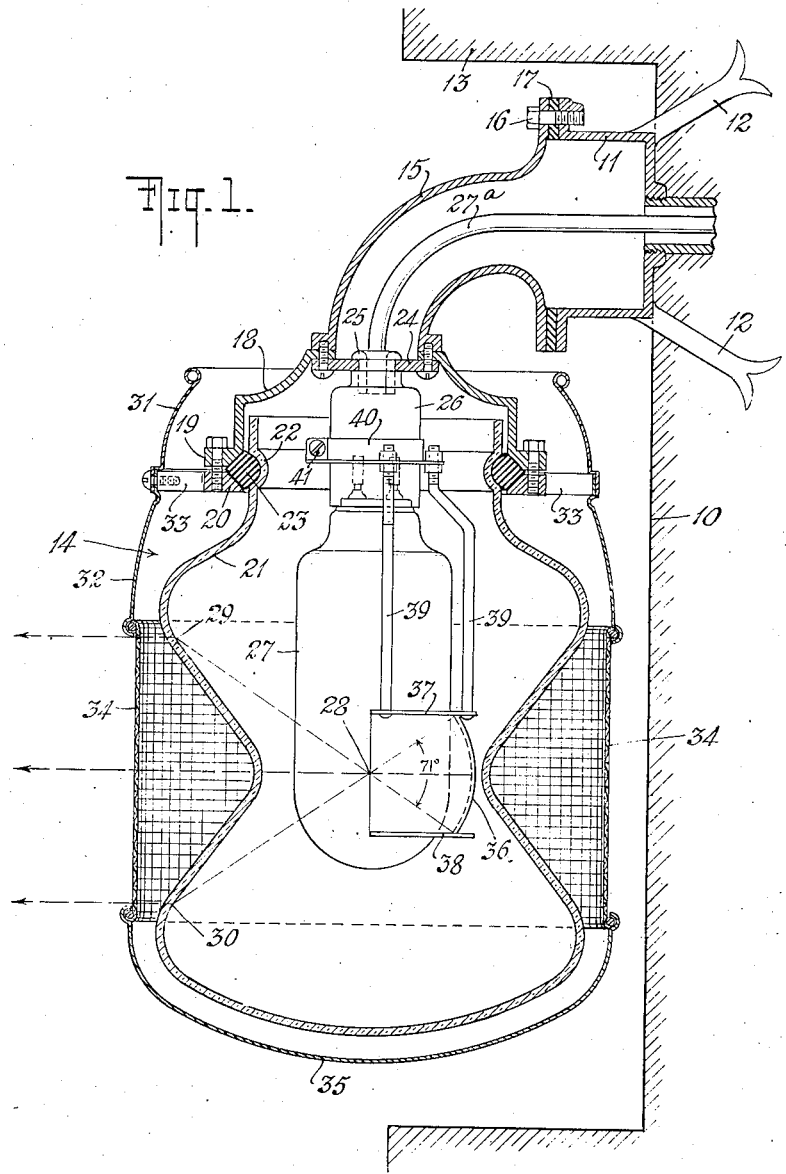

July 25, 1944.　　　　　R. WENDEL　　　　　2,354,237

PROJECTOR

Filed Jan. 11, 1941　　　5 Sheets-Sheet 1

WITNESS

INVENTOR
RUDOLF WENDEL
ATTORNEYS

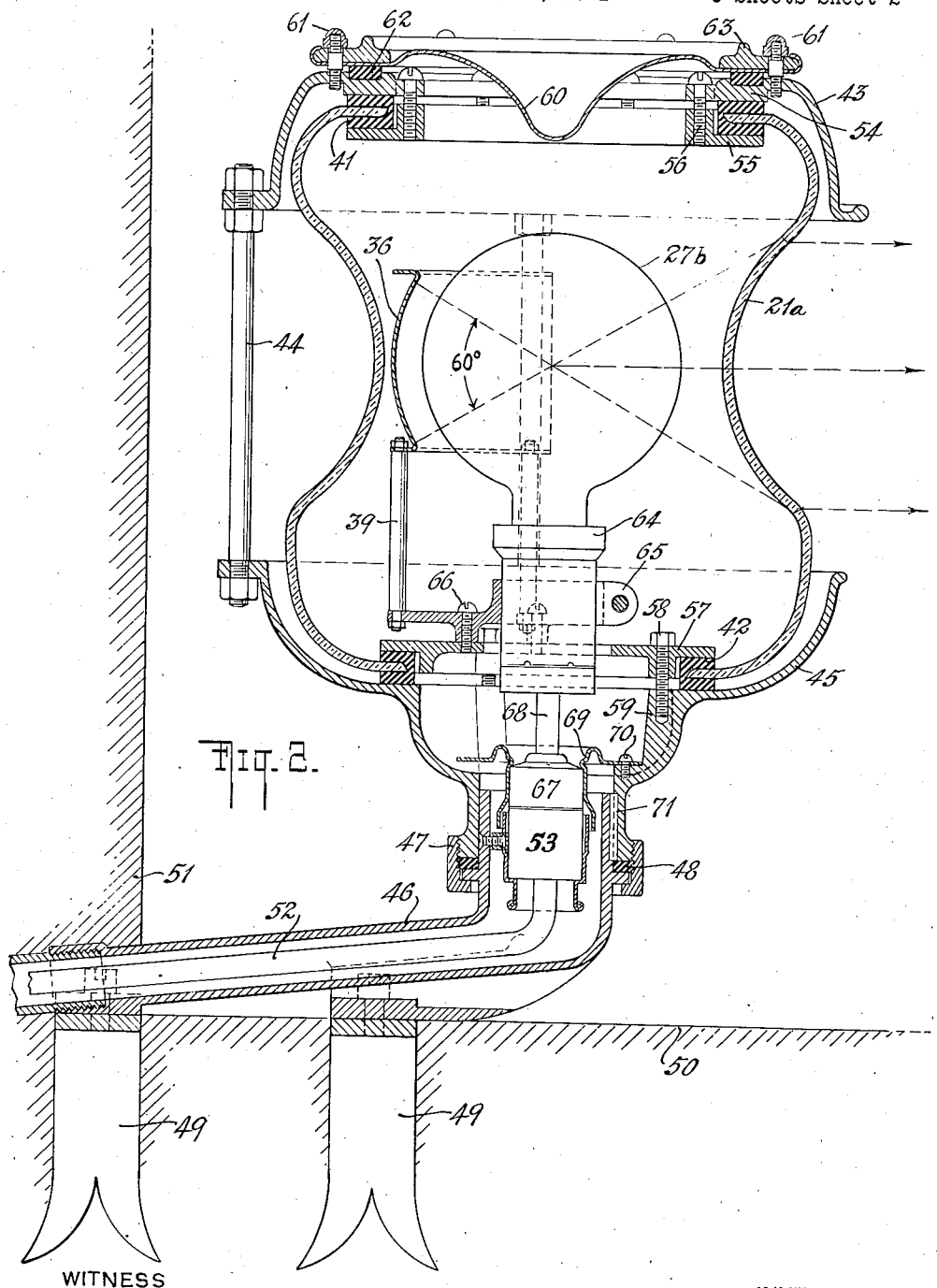

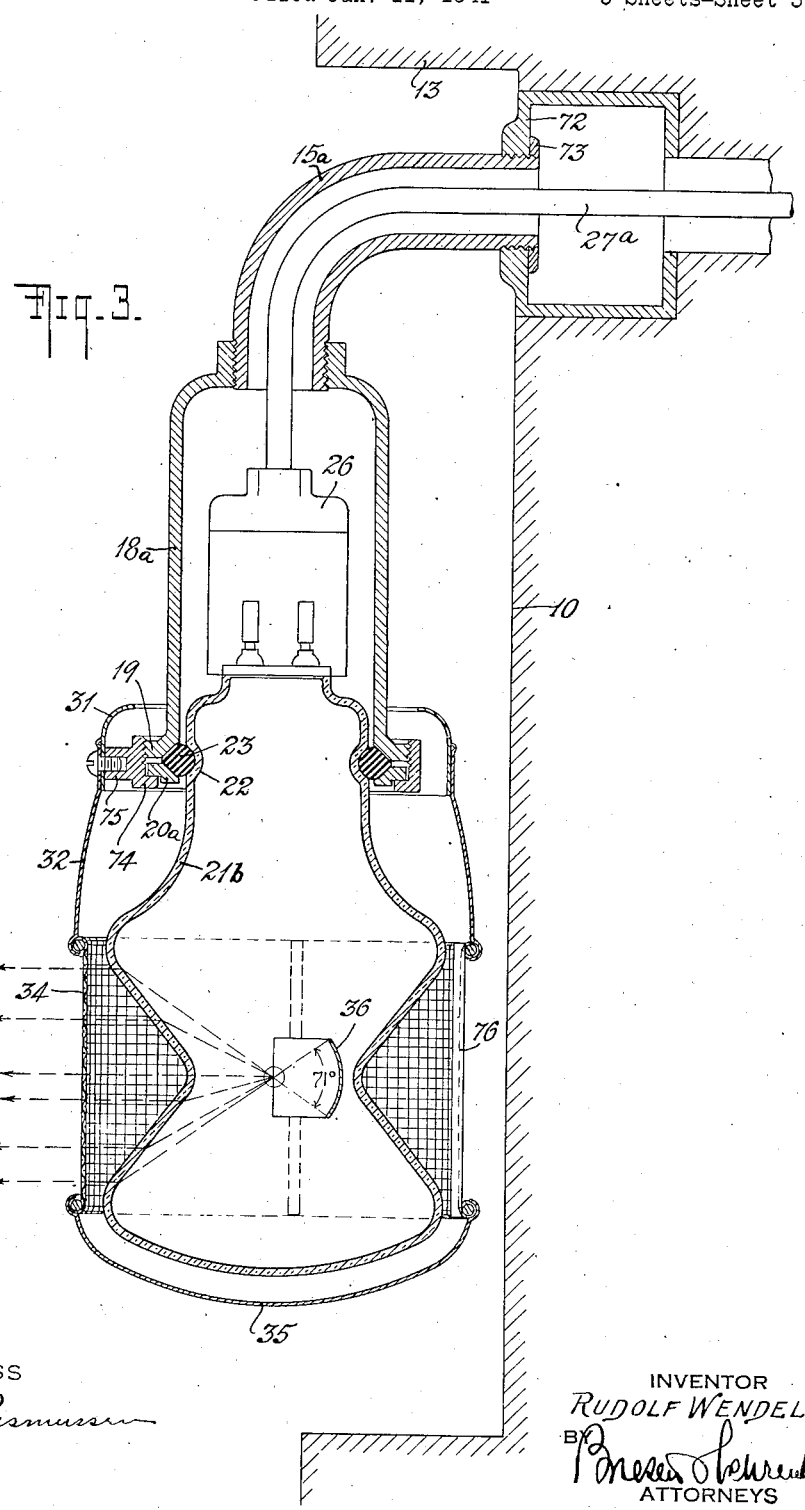

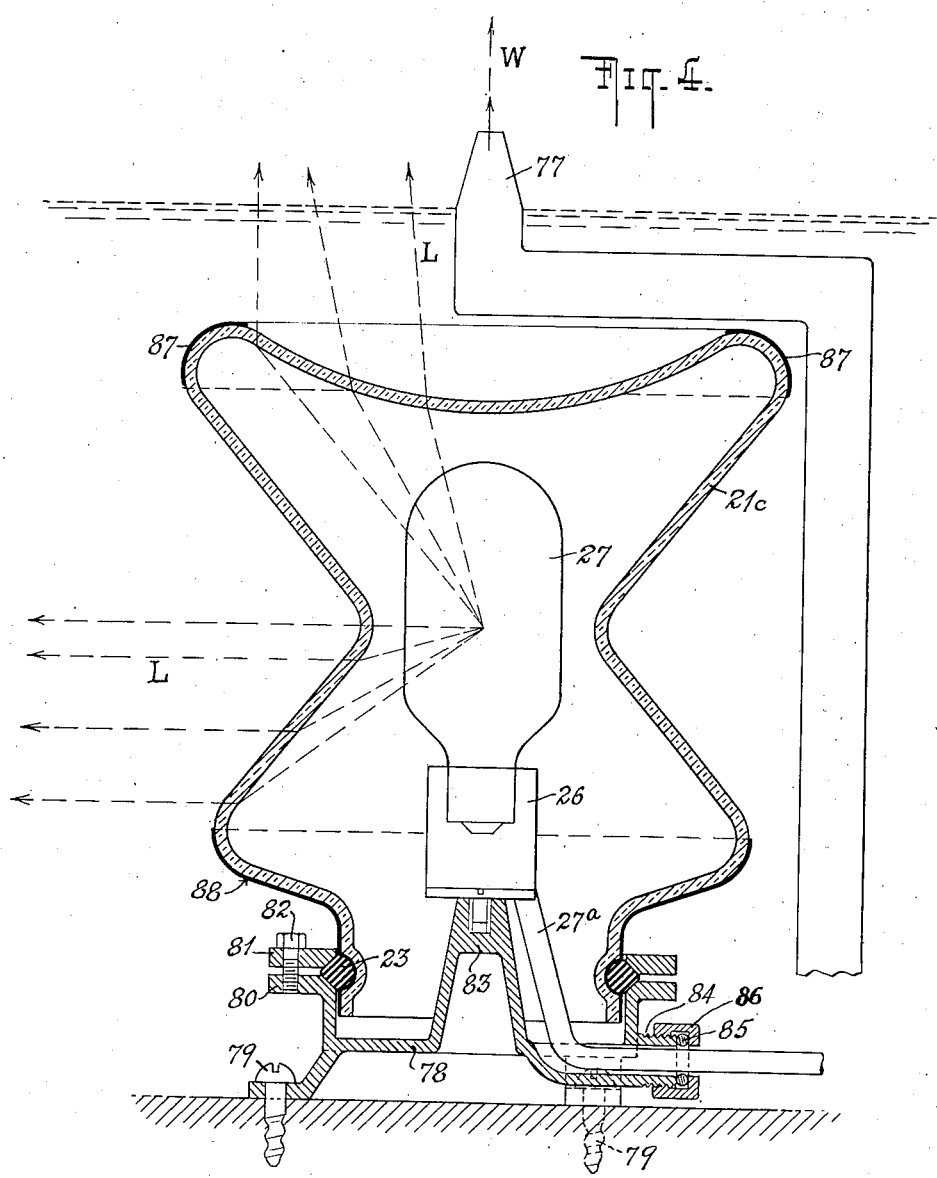

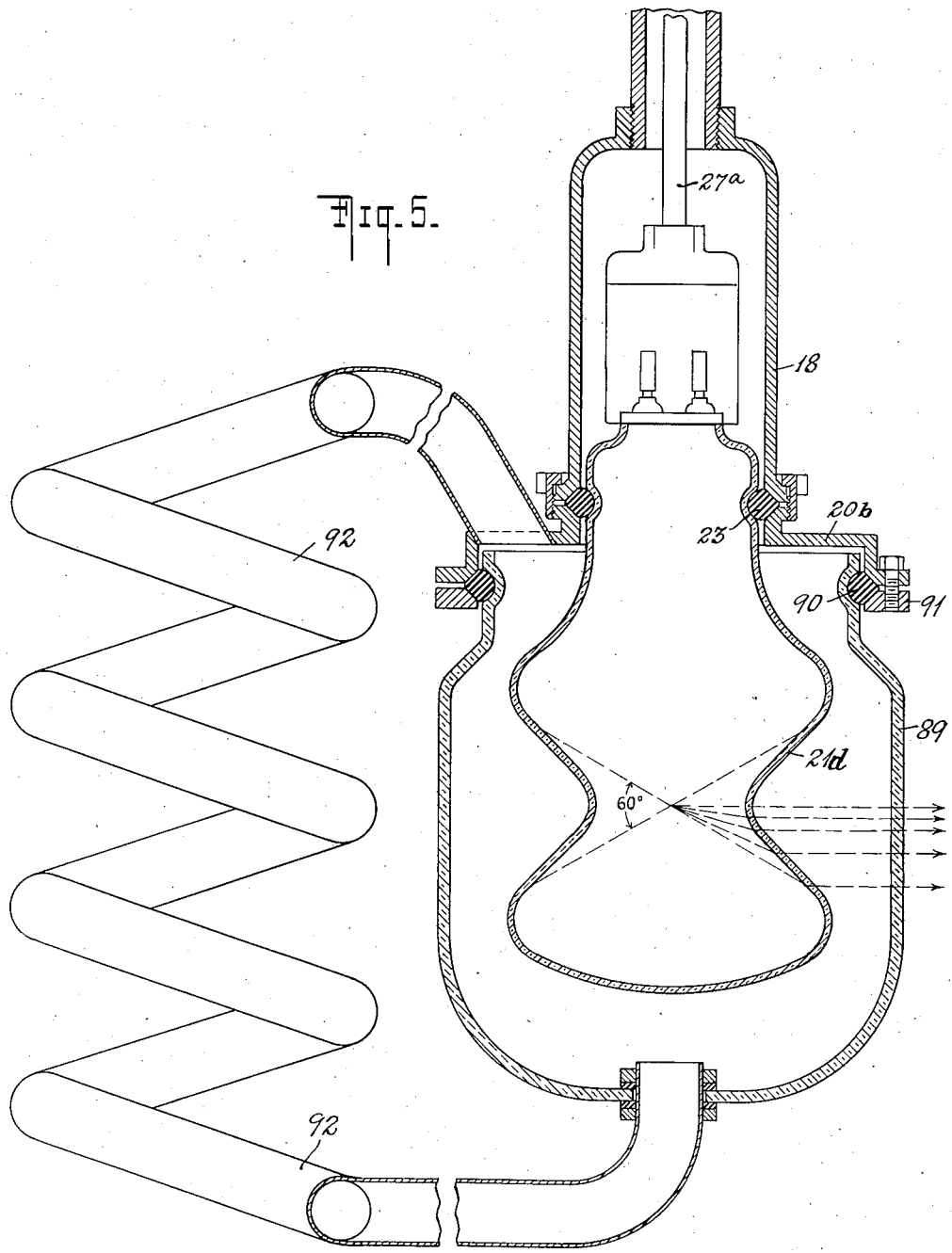

Patented July 25, 1944

2,354,237

UNITED STATES PATENT OFFICE 2,354,237

PROJECTOR

Rudolf Wendel, Roslyn Heights, N. Y.

Application January 11, 1941, Serial No. 374,039

5 Claims. (Cl. 240—26)

The present invention relates to light projectors, and more particularly to projectors wherein the projected beam or beams are caused to travel along selected or predetermined paths.

It is the general object of the invention to provide a projector which is so constructed that it will direct the beam or beams in a selected direction or directions and with a predetermined width or spread of beam, the rays being either more or less parallel in a given direction, diverging in such general direction within selected angular limits.

It is one of the objects of the invention to provide a projector which is adapted to be immersed or surrounded by a body of liquid and which is capable of directing the rays of light either in a parallel beam or along a beam of any desired angular spread without the aid of glass lenses or the like, thereby to produce an extremely simple and inexpensive construction.

More particularly, it is an object of the invention to provide a projector which may be described as being of the "liquid lens" or, more specifically, "water lens" type, which is designed for immersion in a body of liquid, usually water, or to be surrounded by a, preferably circulating, body of liquid, and whose outer casing or bulb is shaped in dependence on the indices of refraction of its own material and of the surrounding liquid and in such manner that either a parallel-ray beam or a beam whose rays diverge at a predetermined angle is obtained.

It is a further object of the invention to construct a projector in such manner that selected regions about the same are uniformly illuminated thereby while the source of light is completely concealed.

Other objects of the invention will appear from the following detailed description of the invention.

Projectors constructed in accordance with the invention are suitable for use in practically all situations where uniform illumination, or illumination of limited areas or in certain directions is desired. Thus my improved projector may be used in swimming pools and in fountains beneath the surface of the water, or in lighthouse projectors, road illuminators, etc., being in the latter two and similar cases provided with a transparent jacket containing water or other liquid for providing the "water lens" and desirably also for cooling the lamp. In each case the water or other liquid into which the light is directed acts as part of the lens, the other part being the suitably shaped outer casing or bulb of the lamp proper. Where it is desired to conceal the source of light, as in the illumination of swimming pools, fountains, roadways, air fields and the like, this may be accomplished by predetermining the spread of the beam and by shielding parts of the lamp in combination with suitable positioning thereof, as will be explained more fully hereinbelow.

The liquid lens provided by the present invention may be considered to be of plano-convex character, the convex surface of the lens being determined by the shape of the transparent outer casing or bulb of the projector. The shape of such casing or bulb is determined in accordance with well-known optical principles to cause the rays refracted on entering the body of liquid to travel in predetermined directions. The outer casing or bulb is preferably made in the form of a body of revolution and the body of liquid, generally water, contacting the outer surface of the casing or bulb, forms in effect an annular lens. When the projector is employed as a beacon, or for illuminating a fountain or the like, the lens can be made effective through an angle of 360°; for use in a swimming pool, the angle of the beam will be about 180°, or slightly more, as explained below. The direction of the refracted rays will be determined primarily by the index of refraction of the liquid with reference to the medium inside the casing or bulb, the material of the casing or bulb itself being without effect upon such direction as the wall is made of as uniform thickness as possible.

Several embodiments of the invention are illustrated by way of example on the accompanying drawings, wherein Fig. 1 illustrates a projector construction in accordance with the invention adapted to be suspended from the wall of a swimming pool, below the surface of the water, for illuminating the body of water, the structure being shown in vertical section and partly in elevation; Fig. 2 is a similar view showing a modified form of lamp structure designed to be supported at its bottom upon the floor of a pool; Fig. 3 shows a lamp arrangement similar to Fig. 1, but embodying a different form of lamp in which the separate inner bulb of Figs. 1 and 2 is omitted; Fig. 4 shows a still further modification of the invention which is suitable for illuminating both the body of water in the well and the spray of a fountain; and Fig. 5 shows a form of construction suitable for lighthouse lamps, and for the illumination of roadways, air fields, and the like.

As already indicated, one of the features of my improved lamp construction is that, due to the shaping of the outer bulb or casing of the lamp, the light from the filament or other source of light is refracted in such manner on entering the wall of the external casing or bulb, and particularly on entering the medium about such casing or bulb, that it is directed along a delimited path, the rays being either parallel or travelling at a predetermined angle with respect to a selected reference line. One of the uses to which such a lamp may be put is in the illumination of the body of water in a swimming pool to produce a very pleasing shimmering and fluorescent effect. In accordance with a preferred construction, the light is spread uniformly about the lamp through an angle of slightly more than 180°, so as to illuminate the opposite wall and the side walls of the pool and also, at least in part, the wall to which the lamp is secured. Provision is made, as will be described below, for preventing any stray or spill light from passing into the space above the water surface, so that the source of light remains concealed.

Referring to Fig. 1, the numeral 10 indicates a wall of a swimming pool or similar structure from which is suspended a bracket 11 which is anchored within the wall 10 by means of the elements 12, the latter being held in place in suitably drilled holes by means of a water-proof cement or the like, or being placed in position during the construction of the pool. In the wall structure shown in the drawings, the wall overhangs the lamp to a certain extent, as shown at 13, to aid in concealing the lamp, although this is not absolutely essential. Both the bracket 11 and the structure about to be described are below the normal water level of the pool.

The bracket 11 is of hollow form and the lamp, indicated generally at 14, is suspended from such bracket by a hollow elbow-like member 15. The latter is secured to the bracket 11 by way of lapping flanges which are secured to each other by bolts or screws 16, a rubber or other gasket 17 being positioned between the flanges to insure a water-tight joint. From the other end of the member 15, there is suspended a hood 18 which is secured in water-tight manner thereto by welding or otherwise. The lower end of the hood is flanged as shown at 19 and is secured, as by means of bolts or screws, to a sealing and supporting ring 20. The flange 19 and ring 20 constitute the immediate suspension for the outer casing or bulb 21 which is made of glass or other transparent material and of such a nature as to be capable of withstanding the temperature differences to which it is subjected in use. The upper portion of the casing 21 is provided with a circumferential groove 22 within which seats a sealing ring 23 of rubber or the like, the ring 23 being compressed between the flange 19 and ring 20 in such manner as to produce a water-tight connection between the interior of the casing 21 and the external body of water. It will thus be seen that the interior of the casing 21 and of the parts 15 and 11 is sealed against the entry of water.

A plate or spider 24 is secured to the hood 18 at the inside thereof, the plate being provided with a central opening through which passes a bushing 25 by means of which an electrical socket member 26 is suspended from the plate. An electric cable 27a passes from the line conductors to the socket 26. The latter is adapted to receive a lamp 27 of any suitable form, preferably one having a concentrated source of light, i. e. a filament of small dimensions, whose center is indicated by the point 28.

In accordance with the invention, the shape of the casing 21 is so determined that the rays passing into the body of water are either parallel or are confined within predetermined limits of divergence. In the case of a swimming pool, the rays may diverge as much as about 30° in the vertical plane (i. e. about 15° to the horizontal) without rendering the source of light visible from above the surface of the water. This is due to the fact that within an angle of about 15° to the horizontal, the light is reflected from the surface of the water back into the pool, and where it is desired to illuminate also the floor of the pool, the casing 21 will be constructed in such a manner as to cause the rays to diverge up to as much as 15° to the horizontal. The floor will then be illuminated both by rays reaching the same directly from the lamp and by rays reflected directly from the water.

In the construction of the outer casing 21 there are taken into account the direction from which the light strikes the inner wall of the casing, and the indices of refraction of the material of the casing and of the water. The effective portion of the casing is located approximately between the points 29 and 30, and the portion 29—30 is accordingly given a shape such that rays passing therefrom into the water will have a maximum angle of divergence of 15° to the horizontal. With this limiting angle in view, and the indices of refraction of the material of the casing material and of the water being known, the shape of the portion 29—30 can be readily determined by those familiar with the laws of optics.

To prevent light from passing upwardly from the casing at an angle greater than about 15° to the horizontal and thereby betraying the location of the lamp, the upper surface of the lamp can be provided with a black coating, as in Fig. 3 described below, but I prefer, in the case of a lamp located in a swimming pool, to block such stray or spill light by means of a shade 31 which overhangs the flange 19 sufficiently to prevent the escape of light. A second shade 32 is positioned directly about the upper portion of the casing 21, and both shades may be secured, as by screws or the like, to radial arms 33 extending from the ring 20. The shades 31 and 32, aside from preventing light from traveling upwardly from the lamp, also protect the lamp against mechanical injury, and to protect the effective portion 29—30 of the lamp against similar injury, a screen 34 is arranged about the same, the screen being suspended from the lower end of the shade 32. It will be understood that the screen is sufficiently coarse to constitute no material barrier to the passage of light into the water. From the screen 34 there is suspended a shade 35 which underlies the bottom of the casing 21 and prevents intense illumination of the floor of the pool or of the water in the region directly below the lamp, which would cause non-uniform illumination and also act to reveal the location of the lamp.

It will be seen from the foregoing that the casing 21, or rather the effective portion 29—30 thereof, forms with the water adjoining the same a combination lens which in the form of the invention illustrated in Fig. 1 can be considered as of plano-convex shape, the convex surface being provided by the outline of the lamp casing, and the plane surface by the body of water. It will be understood that the casing will be made of a material which can withstand the temperature differences to which it must be subjected in use. The lamp is effectively cooled by the water surrounding the same, the water circulating upwardly through the spaces between the arms 33. If desired, the shade 35 may be provided with openings, suitably covered by opaque shades to prevent direct illumination of the bottom of the pool, to promote circulation of water from the bottom of the lamp casing upwardly.

In a further development of the invention, I provide means for intensifying the beam emitted by the lamp. To this end, I provide a reflector 36 of spheroid contour about the bulb 27, the reflector being so arranged that light passing rearwardly is reflected back toward the front of the lamp. The reflector may be of any suitable construction, either metallic or of glass, and is provided with a reflecting surface of chromium, silver or the like. It is supported between plates 37 and 38, and is suspended by rods 39 from a split ring 40 which is adjustably clamped upon the socket 26, the ring being tightened by means of a screw 41. The vertically adjustable ring 40 enables the reflector 36 to be adjusted for slight variations in the position of the lamp filament. The reflector 36 has the additional function of preventing the escape of light rearwardly and to the sides of the lamp within the limits of the screen 34; beyond the limits of such screen, the light is blocked by the shades, 31, 32, and 35.

As will be clear from the above description, the projector will emit a beam through a predetermined horizontal angle, the rays being either parallel or having a limited degree of divergence. The light emitted by the projector is uniformly distributed, and the reflection of the light from the sides and bottom of the pool and from the surface of the water into the body of water produces a shimmering and fluorescent effect which is very beautiful and gives the effect of a uniformly illuminated mass of water. The total concealment of the source of the light further adds to the mysterious and magical effect.

So efficient and uniform is the distribution of light by my improved projector, that, in an installation made by me, a single projector having a 2000 watt lamp was sufficient to illuminate all parts of a swimming pool about 100 ft. x 50 ft. in dimension, the illumination being in fact more uniform than in known installations using a plurality of projectors.

The lamp can be readily constructed for mounting as a unit within the pool, and broken parts can be easily and inexpensively replaced. It will be noted that in case of breakage of the casing 21 during use, the passage of water into the conduit for the cable 27 is effectively prevented by the sealing plate 24 where such plate is imperforate except for its central aperture through which bushing 25 passes. All of the parts immersed in the liquid are made of or coated with a material, such as copper, bronze or the like, which is capable of withstanding the corrosive action of the water, which may contain chlorine or other disinfectant.

As shown in Fig. 1, the outline of the casing will be of roughly hyperbolic shape in cross-section. The specific outline, as already explained, will depend upon the direction of the rays striking the casing from the interior, and upon the indices of refraction of the glass or other transparent material of which the casing is made, and of the water. The refractive index for glass may be taken as 1.5 while that of the water is 1.3 with reference to a value of 1 for air. The height of the annular water lens about the curved region 29—30 can be varied within limits determined by the minimum safe distance between the casing and filament and by considerations of size. A height of lens which subtends an angle of about 71° at the filament has been found to be satisfactory.

The projector may, of course, be designed for a spread of 360°, as where the projector is to be used as a beacon, but usually a spread of less than 360° will be required. The projector shown in Fig. 1 may be installed at a point about 2 feet below the surface of the water.

Fig. 1 shows a construction in which the lamp filament is arranged along the central line of the projected beam; but it will be obvious that this relationship is not essential and that the shape of the casing can be altered to obtain any desired direction of beam. Also, the filament can be located elsewhere than at the approximate center of the casing, in which case the shape of the casing may assume a less regular form than in Fig. 1, for obtaining special lighting effects.

While the "critical angle" for water with respect to air, that is, the angle at which total reflection back into the water occurs, is about 41° to the horizontal, I prefer to limit the angle to the horizontal of the projected rays to about 15–20°, in order to avoid reducing too greatly the intensity of the beam in the region of the opposite wall, and also to avoid producing a brightly illuminated area on the bottom of the pool close to the lamp (the depth of the water being only about 6 feet in the vicinity of the lamp).

The construction shown in Fig. 2, while in principle similar to that of Fig. 1, embodies certain additional novel features of construction whereby the glass casing is protected against injury, and replacement of the incandescent bulb and removal of the whole projector as a unit facilitated.

The outer glass casing 21a is mounted between rubber gaskets 41 and 42 in such a manner that a floating support is provided therefor within a rigid encasing structure. The protecting structure for the lamp is so devised that any weight imposed upon the cover of the projector, for example the accidental stepping on the projector by a bather, will not subject the glass casing to any stress, the pressure being instead transmitted by rigid elements to the floor of the pool. To this end, the protecting cover 43, which is made of metal or the like, is secured by three or more bolts 44 to the lower cup-shaped protecting member 45 whose lower, reduced end is connected with the pipe 46 by way of a union coupling 47, a gasket 48 being disposed between the lower end of the member 45 and a suitable flange on the pipe 46. The pipe 46 is supported by the anchoring devices 49 embedded in the floor of the pool, the pipe extending into the side wall 51 of the pool. The pipe 46 is adapted to house the conductor cable 52 leading from a source of electric current and connected to a socket member 53 which is rigidly secured within the upper portion of the pipe. Provision may also be made for draining off any water that may flow or seep into the interior of the pipe 46.

The glass casing 21a is floatingly supported between the protecting plates 43 and 45 by way of the U-shaped gaskets 41 and 42. The gasket 41 is clamped in water-tight manner between an upper annular portion 54 of the cover 43 and a clamping ring 55 by means of the screws 56. In similar fashion, the bottom gasket 42 is clamped against the flat inner surface of the cup-shaped member 45 by means of an annular clamping ring 57 which is provided with suitable apertures through which pass screws 58, the latter being received in tapped holes within suitable enlargements 59 in the member 45. It will be seen that by means of these clamping devices the gaskets 41 and 42 are tightly clamped against and about the upper and lower peripheries of the casing 21a and against the members 43 and 45.

To prevent the passage of light directly from the lamp 27b into the body of water directly above the same, a shield 60 is clamped to the upper surface of the member 43 by way of thumb screws 61, a gasket 62 being interposed between the shield 60 and the member 43, a clamping ring 63 serving to provide water-tight contact between the shield and the gasket. It will be apparent that the shield 60 serves at the same time to close the upper portion of the glass casing 21a against the entry of water.

The lamp bulb may be of the spherical type as distinguished from the tubular type shown in Fig. 1 and is supported upon a suitable base 64. The base is clamped to a bracket 65 which in turn is secured to the ring 57 by means of the screws 66. Upon the bracket 65 there is supported by way of the rods or bolts 39 a reflector 36 similar to that shown in Fig. 1.

The central portion of the transparent annular casing 21a is designed to provide, upon immersion in the body of water in the pool or the like, an annular water lens of such convexity that the rays emanating from the filament of the lamp are directed in the form of a more or less parallel bundle of rays into the body of water. The effective portion of the annular casing subtends an angle of about 60° at the filament and provides a beam which is sufficiently wide in the vertical direction to illuminate the whole body of the water in the pool both directly and by reflection from the sides and bottom of the pool and from the top surface of the water. The lamp can, where necessary, be provided with a protecting screen, such as the screen 34 in Fig. 1, and as in the construction shown in Fig. 1, the rear portion of the casing may be provided with a coating of black paint or the like, or with a suitable shield, to prevent illumination of the adjacent wall of the pool.

The socket 64 of the bulb 27b is provided with a plug 67, the conductors running from the socket to the plug through a metallic connection 68. The plug is rigidly secured by way of its metallic casing 69 to the interior surface of the member 45 by way of screws 70. The socket 64 and plug 67 are thus rigidly mounted within and secured to the member 45, as is also the casing 21a of the lamp. It will thus be seen that upon release of the coupling 47, the member 45 and all the parts secured thereto may be readily separated from the pipe 46 and the socket member 53 located therein. To insure proper positioning of the plug 67 with respect to the socket 53, a cooperating feather and keyway 71 may be provided on the parts 45 and 46.

Fig. 3 shows a more simplified construction in which the casing constitutes at the same time the bulb for the filament of the lamp; that is, the casing constitutes the lamp itself instead of being constructed as a separate element surrounding the lamp itself, as in Figs. 1 and 2. The projector of Fig. 3 is constructed along the same principles as discussed in connection with Figs. 1 and 2, except that the special outline necessary for creating the water lens effect is incorporated in the bulb itself, which is blown in a mold, and is shaped in accordance with the above described outlines. It will be understood that the interior of the casing 21b in Fig. 3 is either a vacuum or is filled with any suitable gas in accordance with known incandescent bulb construction. The lamp as a whole can accordingly be made considerably smaller for the same lighting capacity than the structure shown in Fig. 1, the reduction in size being made possible by the fact that the bulb is cooled directly by the water, so that the rate of heat withdrawal can be quite as great for the smaller lamp of Fig. 3 as for the larger lamps of Figs. 1 and 2. The lamp of Fig. 3 can in fact be made about half the size of that of Figs. 1 and 2.

Parts in Fig. 3 similar to those in Fig. 1 have been similarly designated. Aside from the construction of the lamp itself, the structure of Fig. 3 differs from that of Fig. 1 also in the manner of the anchoring of the suspension support for the lamp. In the form shown in Fig. 3, the elbow 15a is threaded at both ends and is fixed within an anchoring box 72 with the aid of a nut 73. The hood 18a is screwed to the other end of the elbow, the lower end of the hood being connected to the clamping ring 20a by way of a union 74 which is provided with a number of arms 75 to which the shields or shades 31 and 32 are connected by screws or the like. The screen 34 may be provided with stiffening rods 76 at suitably spaced intervals.

The projector shown in Fig. 4 is constructed to effect illumination both of the spray of a fountain as well as of the body of water in the well of the fountain. To this end the glass casing 21c is so shaped as to provide both a convex annular water lens about its central portion and a convex water lens at the top thereof to direct the beams along predetermined directions, while at the same time preventing the escape of light in directions meeting the eyes of observers about the fountain, so that the source of light remains concealed. The projector is preferably although not necessarily located directly below the nozzle 77 of the fountain and is supported directly from the bottom of the fountain by way of a bracket 78 which is secured to the fountain floor by screws 79 or the like. The bracket 78 is composed of a solid metal plate and serves as the bottom or closure for the lower, open end of the casing 21c. The bracket includes an annular flange 80 which is sealed against the bottom portion of the casing 21c with the aid of a sealing ring 23 of rubber or the like, the ring being pressed between the flange 80 and the casing by means of a clamping ring 81 which is secured to the flange by way of screws 82. The bracket 78 has a raised central portion 83 upon which the socket 26 of the bulb 27 is supported. The conductors are led from the socket by way of a metallic or other waterproof pipe 27a, the latter being led off through a threaded side extension 84 of the bracket; the end of the extension being sealed against the pipe by way of a sealing member 85 and union 86. The interior of the casing is thus protected against the entry of water.

To prevent light from reaching the eyes of spectators at the edge of the fountain, or at a distance therefrom, the outer edge portion at the top of the casing 21c is coated with a black paint, as shown at 87, or provided with any other suitable opaque covering; while a similar coating or covering 88 is provided at the bottom of the casing. The emerging rays of light L thus travel only in predetermined directions, the side rays being directed more or less horizontally into the body of water in the well of the fountain, while the upwardly travelling rays are directed more or less vertically against the spray of water W discharged by the nozzle 77. The lighting effect is one of great beauty as the drops of water in the spray take on the character of illuminated diamonds, while the body of water at the bottom of the fountain gleams with an internal luminescence whose source is not visible.

For use in lighthouses and for the illumination of roadways, airports and the like, that is, in situations wherein the projector is not employed to illuminate a body of water, the construction shown in Fig. 5 presents a simple and inexpensive projector for obtaining a highly efficient illumination. In this form of the invention the outer casing may at the same time constitute the lamp bulb, as in the construction shown in Fig. 3, or it may be designed to receive a separate lamp bulb as shown in Figs. 1, 2, and 4. The sides of the casing 21d are shaped in the manner described hereinabove, and in accordance with the invention the casing is surrounded by a jacket 89 which is designed to receive a body of cooling water which at the same time acts as a lens against the curved and roughly hyperbolic outline of the casing. The casing may be secured in water-tight relation to a hood 18a in the manner described hereinabove, the lower clamping ring 20b serving at the same time as a suspension for the jacket 89 which, as shown, is made of glass or other transparent material. A sealing ring or gasket 90 seals the jacket against the ring 20b with the aid of a clamping ring 91. The water in the jacket circulates thermo-siphonically through a cooling coil 92 located externally of the jacket and connected in water-tight manner with the upper and lower portions of the jacket 89. It will be understood that the water in the jacket becomes heated during the operation of the projector and flows upwardly into the coil 92, and after being cooled in the latter, returns to the bottom of the jacket. The projector shown in Fig. 5 is designed especially for use in lighthouses and the outline of the sides of the casing 21d is so determined that the rays emerge in a more or less parallel beam from the projector. The beam may extend horizontally through approximately 360°, or for such fraction thereof as may be desired; in the latter case, suitable shields are provided, and if desired, a reflector of the type shown at 36 in Fig. 1 may be located in the jacket 89 outside of the casing 21d, or inside of the latter when a separate light bulb is employed. The source of light may, of course, be either an incandescent filament, an electric arc, a fluorescent lamp, or the like.

It will be seen from the foregoing that I have provided a projector which is capable of directing the light rays along predetermined paths without the aid of any special lenses, or special cutting or grinding, the casing of the projector being of more or less uniform thickness throughout and being readily manufactured at a low cost. The distribution of light is both efficient and uniform, and as indicated above, highly ornamental effects can be obtained therewith when employed for illuminating either more or less stagnant or moving bodies of liquid.

In general, for use in lighthouses and for the illumination of airfields, roadways, and the like, an exactly or very nearly horizontal beam, i. e. one in which the rays are parallel or practically so, will be preferable, as thereby a more concentrated beam will be obtained, and the outline of the casing or bulb will be shaped accordingly to produce the requisite water lens effect. For similar reasons, it is desirable to keep the vertical spread of the beam in the case of swimming pools relatively small, so as to obtain better illumination of the farther end of the pool; too great a vertical spread, such as 40° to the horizontal, would not only produce uneven illumination, but would cause excessively bright illumination of the floor near the projector in a semi-circular pattern, which would in addition betray the location of the lamp.

I prefer to install the projector unit slightly forward from the vertical axis, which means that the circular section of the unit projects about 1" more than the half circle into the water. Through this arrangement, there is obtained direct lighting of the wall in which the unit is installed. This, of course, means that the lighting of this unit is slightly above 180 degrees in the horizontal plane, which spread is obtained automatically through the shape of the filament, which is not a point but a circular body of approximately 3/4" in diameter.

The light emerging from the projector is reflected back and forth, in many instances, and there is thus obtained a practically even illumination of the walls and bottom of the pool, which makes the water appear as a lighted body. The illuminated inner shell of the pool can actually be seen through the clear water which in itself does not show any lighting.

The water supply line to the spray nozzle in Fig. 4 is advantageously inclined to the horizontal to avoid producing a shadow zone; while in the construction of Fig. 5, the thermo-siphonic circulation can, of course, be replaced by forced circulation by means of a pump, especially in the case of large, high powered units.

The casing or bulb which forms the water lens is best constructed as a body of revolution, although this is not essential where the horizontal spread of the emitted beam is less than 360°. These parts are preferably made of well-annealed glass, although other transparent material, colored or not, may be used.

I claim:

1. A light projector for projecting a substantially parallel beam into a region wholly outside the projector, comprising a source of light and a transparent casing about the same, the projector being adapted to be immersed in a transparent body of liquid, the outer surface of said casing being shaped in dependence upon the index of refraction of the mass of transparent liquid which is to be in contact with such outer surface of the casing during the use of the projector so as to form a liquid lens surface at which the light rays from said source are bent into a substantially parallel beam and travel as such through the body of liquid, and shields disposed about the projector and adapted to prevent intense illumination of objects in the vicinity of the projector and thereby aid in concealing the source of the light.

2. Apparatus for illuminating the water of a swimming pool or the like, comprising a projector including a transparent outer casing and a source of light inside the same, the casing being directly contacted by the water of the pool, means for supporting the projector below the surface of the water adjacent to a wall of the pool, the outline of the casing being so shaped in dependence on the index of refraction of the water as to form a convex water lens of the contiguous body of water to refract the rays passing into the water about the casing along a delimited, predetermined path, and with such maximum angularity of the rays with reference to the horizontal plane that substantially no light rays from the projector emerge from the surface of the pool, and means for shielding all parts of the casing except that portion through which light passes to the opposite wall and the side walls of the pool, whereby intense illumination of the adjacent side wall and of the bottom wall of the pool is prevented.

3. Apparatus for illuminating the water of a swimming pool or the like, while concealing the source of light, comprising a projector, a support for securing the projector adjacent to a wall of the pool and below the surface of the water, said projector including a transparent outer casing open at one end, and a socket for a lamp bulb within the casing; means for securing the open end of the casing to the support in watertight manner, the central portion of the casing being of curved outline to form with the surrounding body of water an arcuate water lens of such configuration that light rays emanating from the bulb are directed through a horizontal arc into the water in a substantially horizontal beam, whereby substantially no light rays from the projector emerge from the surface of the pool, means for limiting the projected beam to a horizontal arc of about 180°, and shields for preventing escape of light to visible parts of the pool in the vicinity of the projector.

4. Apparatus as set forth in claim 3, including a reflector arranged at the rear of the bulb for reflecting light to the effective water-lens section at the front of the projector.

5. A projector as set forth in claim 3, including a coarse screen disposed about the exposed portion of the casing to protect the same against mechanical injury.

RUDOLF WENDEL.